INVENTOR.
Henry C. Weber

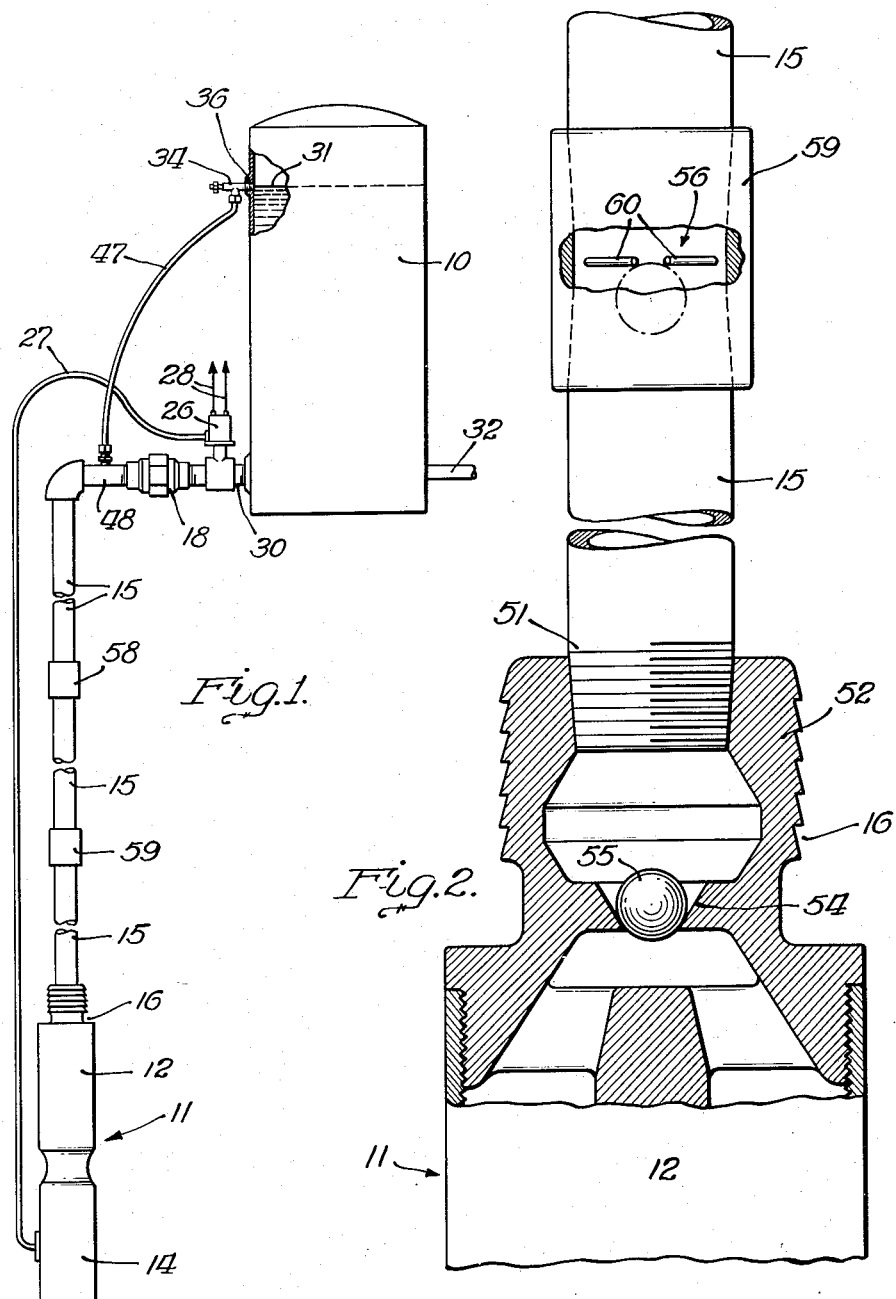

Dec. 1, 1953  H. C. WEBER  2,660,954
AIR VOLUME CONTROL FOR WATER SUPPLY SYSTEMS
Filed Dec. 12, 1950  3 Sheets-Sheet 3

INVENTOR.
Henry C. Weber
BY
Paul L. Kroker
Atty

Patented Dec. 1, 1953

2,660,954

UNITED STATES PATENT OFFICE 2,660,954

AIR VOLUME CONTROL FOR WATER SUPPLY SYSTEMS

Henry C. Weber, St. Louis, Mo., assignor to Fairbanks, Morse & Co., Chicago, Ill., a corporation of Illinois Application December 12, 1950, Serial No. 200,468

6 Claims. (Cl. 103—7)

This invention relates to improvements in fluid pumping systems of the general character embodying a service-water storage reservoir or tank supplied with water from a suitable source, as a well, and wherein the water in the tank is maintained at a predetermined desired level therein under air pressure to facilitate service flow from the tank. More particularly, the present invention concerns the provision of novel and effective means for maintaining the desired air pressure in the tank, operable in accordance with the pumping cycle of the system as will hereinafter appear, to introduce atmospheric air to the tank in replenishment of air lost from the tank as through water drawn from the tank to service use.

In a pumping system of the character indicated, providing a service-water storage tank, a motor-driven pump in a well, and a delivery conduit extending from the discharge side of the pump to the tank, it is desirable to maintain the pump to the tank filled to a predetermined normal level therein, with air admitted to the tank and compressed above the water level for pressurizing the tank water such as to facilitate pressure discharge thereof to service use. Maintenance of tank water to the level desired, usually is accomplished through suitable control of pump operation generally according to either tank air or water pressure, or water level, such that upon drop in pressure or water level from the normal level, the pump is caused to operate to deliver water to the tank until the normal water level is restored. With tank air or water pressure control of the pumping operation, it will be appreciated that unless some effective provision is made to control the volume of air in the tank at shut-down pressure, pump shut-down may occur before the tank water has reached the normal level or after it has exceeded such level, consequent respectively to an excessive or an insufficient volume of air above the water in the tank. Similarly, with water-level control of the pumping operation, the volume of the air in the tank at pump shut-down, may be above or below the desired pressure for efficient pressure discharge of water from the tank to service use. While many different controls have been devised to regulate the tank air volume in a manner to avoid the disadvantageous operating conditions above mentioned, such controls for the most part have been somewhat complicated and costly. It is the primary objective of the present invention therefore, to provide an air volume control of greatly simplified and inexpensive character, which is fully effective to maintain the tank air at the desired normal level in the tank.

The air volume control in accordance with this invention, includes a chambered fitting connected to the storage tank in the zone of the normal water level therein and having restricted communication with the tank interior substantially at the normal tank water level, the fitting further being provided with an atmospheric air inlet under control of a suction operated valve. Connecting the discharge side of the pump to the tank is a water delivery conduit which includes therein a non-return or check valve disposed by preference, relatively close to the tank for preventing return flow of water from the tank through the conduit. A suitable pipe communicates the chambered fitting with the delivery conduit preferably in a zone thereof adjacent the check valve and on the pump side of the latter. Completing the present air volume control is a check valve device arranged in the delivery conduit near the pump, adapted for delayed closure upon cessation of pump delivery of water through the conduit, sufficient to permit a limited return flow of water in the conduit and through the pump. Such return flow or drop-back of water in the conduit results in evacuation of that portion of the conduit extending from the first mentioned check valve on the pump side thereof, which is in communication with the aforementioned chambered fitting. The suction thus created in said portion of the delivery conduit, is reflected in the chambered fitting for actuating the suction operated valve thereof to admit atmospheric air to the fitting and through the pipe connection, to the indicated evacuated portion of the delivery conduit. Upon subsequent operation of the pump, the pumped flow of water in the delivery conduit will displace the volume of air thus admitted to the conduit, into the tank to replenish the volume therein. The foregoing air-admission operation of the control is subject however, to the volume of air in the tank at such time, this being sensed at the fitting through the restricted communication thereof with the tank at the normal water level of the latter. If at the time of pump shut-down, the water level is below the point of such restricted communication, a condition usually attending an excessive volume of air in the tank, the suction produced in the chambered fitting in the manner aforesaid, will draw air from the tank into the fitting and thence into the conduit portion, without admitting atmospheric air. This function of the control will continue in each cycle of pump operation and shut-down, until the tank air volume becomes reduced to the desired volume. Thereafter, if upon pump shut-down in a succeeding cycle, the tank water level should be at or above the point of restricted fitting communication, the control will function to introduce atmospheric air to the evacuated conduit portion, this because flow of tank water into the chambered fitting through the restricted communication, is at such a limited rate as to be insufficient to break the suction in the fitting.

Further objects and advantages of the present improvements will appear from the following description of a presently preferred embodiment of the invention illustrated in the accompanying drawings, wherein:

Fig. 1 illustrates a water pumping system of the character hereinabove indicated, in which the presently improved air volume control is embodied.

Fig. 2 is an enlarged view partly in section, of a portion of the delivery conduit extending from the discharge side of the pump, showing therein one form of delayed closure check valve device forming a part of the present air volume control provision.

Figure 3:
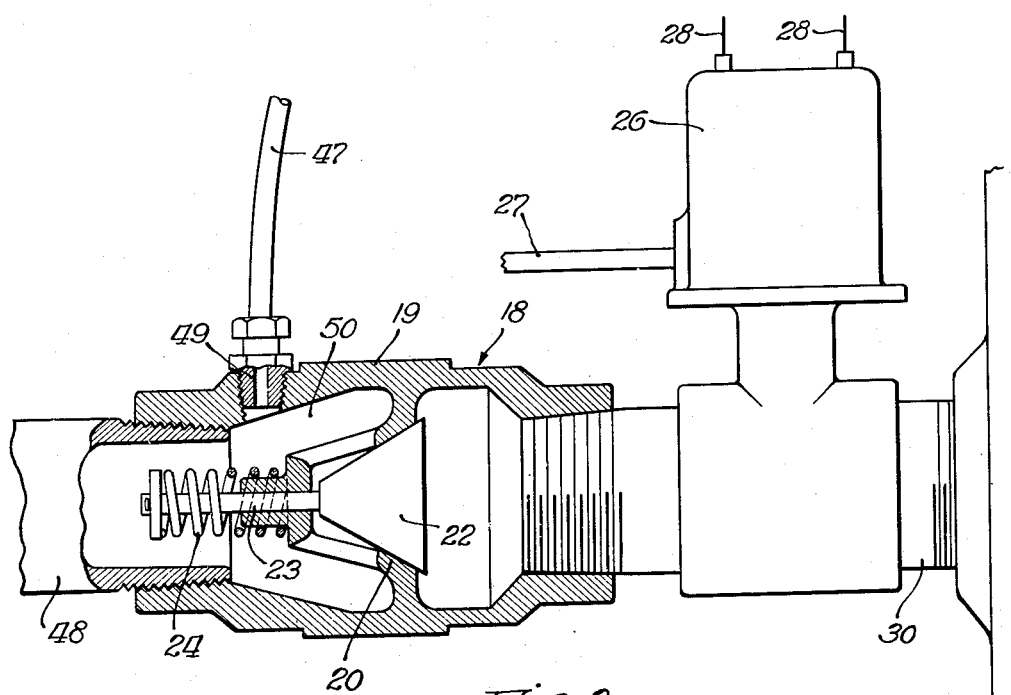
Fig. 3 shows the portion of the delivery conduit at the tank end, illustrating in section a suitable check valve for preventing return flow of water from the tank through the conduit.

Referring to the drawings, Fig. 1 illustrated a pumping system of the type herein described, providing a service water storage reservoir or tank 10, a motor-driven pump unit 11 comprising a pump 12 and an electric motor 14 and adapted for disposition in a well (not shown), and a water delivery conduit 15 extending from the discharge side 16 of the pump to the lower end of the storage tank 10. Included in the conduit near the tank end thereof, is a suitable check valve 18 arranged to prevent return flow of water from the tank 10 through the conduit. The check valve as illustrated by Fig. 3, is comprised of a valve casing 19 interposed in conduit 15 and providing therein a ported valve seat 20 and a movable valve element 22 shown seated on the valve seat 20. The valve element includes a stem 23 through which the valve is loaded in the closing direction, as by suitable spring 24.

Control of pump unit operation is here effected through a presure-responsive pump motor switch device 26 between the motor lead cable 27 and the electric power supply lines 28, the switch being connected preferably to the pump delivery conduit 15 in the portion 30 thereof between the tank and check valve 18 so as to be responsive to the water pressure in the tank. In the pumping system of the present example, the desired normal water level in the tank is indicated by the horizontal line 31 (Fig. 1) and the tank volume above such water level is filled with air compressed by the water volume at such level, to a desired pressure serving to establish a tank water pressure suitable for positive pressure discharge through the tank service outlet 32 upon service demand. If, for example, the compressed air above the tank water at the normal level is at a pressure of 40 pounds, resulting in tank water pressure of the same value, the pressure-responsive pump motor switch device 26 is set to respond to the tank water pressure of 40 pounds, by open-circuiting the motor supply circuit to shut-down the pump. Upon water discharge from the tank to service use, the tank pressure as well as the water level, will drop correspondingly. As is usual in systems of this character, the switch 26 is further conditioned for closure to place the pump unit in operation for pumping water to the tank to restore the normal water level therein, only after the service draw-off from the tank has reduced the tank water pressure an appreciable extent, as from 40 pounds to say, about 20 pounds. At such lowered pressure, the switch responds to cause pump operation, and the latter will continue to pump water to the tank until the tank water pressure reaches 40 pounds, when the pump will cease operation as above indicated. However, during operation of the system some of the tank air will be lost through discharge with the water drawn to service use. Consequently, if the tank air volume is not restored to the volume required for pressuring the tank water to 40 pounds at the normal tank level, the water level in the tank may be above or below the normal level at pump shut-down, depending respectively, upon an insufficient or an excessive volume of air in the tank. Whether the tank air volume is greater or less than the required volume at such time, is in turn dependent upon the effectiveness of the particular makeup air admission and volume control means employed in the system. Accordingly, and as hereinabove stated, it is the principal purpose of the present invention to afford a greatly simplified, economical and highly effective air volume control operating to assure attainment of the required volume of air under compression in the tank when the water level is at the desired normal level therein, sufficient to produce the desired tank water pressure, as 40 pounds in the above example.

Figure 4:
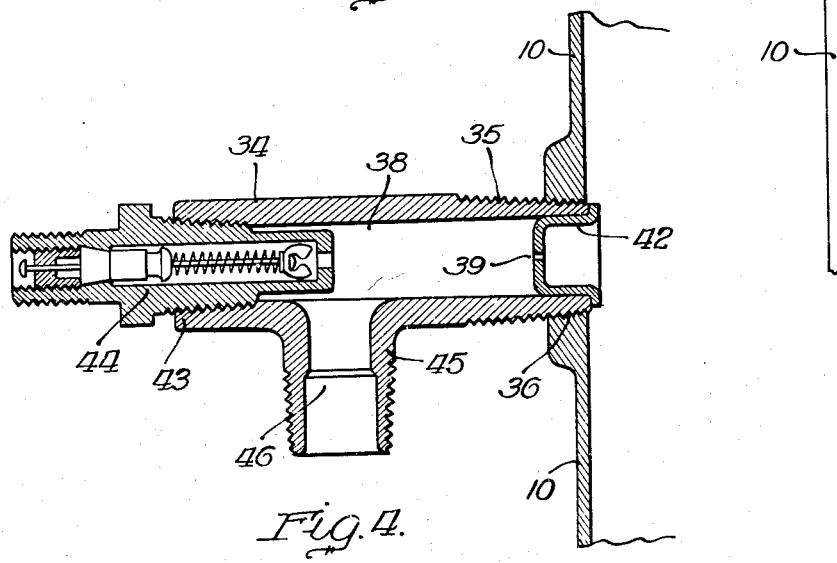
Fig. 4 is an enlarged sectional view of an air admission fitting unit forming a part of the presently improved air volume control.

Referring to Figs. 1 and 4, there is provided a chambered member here shown to be a T-shaped fitting 34, mounted on the tank 10 through its threaded end 35 received in a threaded tank opening indicated at 36, located in the zone of the normal tank water level. The fitting chamber 38 is in communication with the tank interior through a small port 39 provided in a cup-like closure element 42 pressed-in or otherwise suitably mounted in the fitting end 35, the port being disposed such that it is substantially in horizontal alignment with the normal tank water level indicated by the line 31 (Fig. 1). Inserted in the opposite end 43 of the fitting is an atmospheric air admission valve 44 which may be of a well-known form as shown, opening in response to below-atmospheric pressure or suction in the fitting chamber 38, to admit air to the chamber. The stem 45 of the fitting, having the passages 46 open to chamber 38, is threaded to receive one end of a pipe 47 extending to connection with the pump delivery conduit 15 in the section 48 thereof adjacent the check valve 18 on the pump side of the latter, the pipe 47 thus communicating the fitting chamber 38 with the interior of the conduit section 48. If desired, pipe 47 may be connected to the check valve casing 19 as indicated at 49 in Fig. 3, in communication with the interior space 50 thereof which is on the pump side of the valve element 22 and open to the conduit section 48.

The pump unit 11 is suspended in a well (not shown) by the vertical extent of the delivery conduit 15 which at its lower end 51, (Fig. 2) is connected to the discharge end 16 of the pump 12 by a fitting 52 forming a part of the conduit. Formed within the fitting 52 is a ported valve seat 54 (Fig. 2) to accommodate a ball check valve element 55. Ball valve 55 is free in the conduit as appears, for displacement between the seat 54 and a stop provision or abutment indicated at 56 within the vertical portion of conduit 15.

In accordance with usual practice, the pump delivery conduit 15 is made up of a plurality of pipe sections connected by suitable pipe couplings, as the couplings 58 and 59 shown. One of these couplings 59 is utilized conveniently, as a support for the stop means 56 which as indicated in Fig. 2, may comprise a suitable number of short rods or finger elements 60 mounted in the wall of the coupling to project radially in the coupling.

The ball valve 55 formed of a suitable material as hard rubber or the like, is responsive to pump delivery of water through the conduit by upward displacement to the stop fingers 60, and normally will remain in abutment therewith so long as the pump continues to deliver water through the conduit to the tank 10. Upon cessation of pump operation, the ball valve will drop down in the conduit to the valve seat 54, thus to close the conduit to the pump. However, during the period of ball drop down, the water column in the conduit 15 in the extent thereof up to the now closed check valve 18, will undergo downward displacement or drop-back through the open valve seat 54 and pump, and such water drop-back will continue until the ball valve reaches and seats upon the valve seat 54. Consequently, the water column in drop-back through the conduit, will evacuate the upper portion of the conduit including the section 48 adjacent the closed check valve 18 on the pump side thereof, thereby establishing a below-atmospheric pressure or suction in such conduit portion. Since the fitting chamber 38 communicates with the conduit section 48 through pipe 47, it will be evacuated also, so that suction is thus established in the chamber 38 as well as in the conduit section 48. If at such time, the water level in tank 10 is at or above the normal level indicated by the line 31 (Fig. 1), tank water will enter the fitting chamber 38 through the port 39, but at a very slow rate determined by the restricted opening of the port, the rate of inflow amounting to a slow leakage insufficient to nullify the effect of the suction in chamber 38 to cause operation of air valve 44 to admit atmospheric air to the fitting chamber and through pipe 47, to the evacuated space in the conduit section 48. It will be appreciated that the port 39 restricted in size sufficiently to preclude more than a very slow leakage flow of water therethrough, is far less restrictive of air flow, particularly air under pressure as exists in the tank 10. Thus, were the port 39 fully open to the compressed air in the tank, the fitting chamber 38 and conduit section 48 would be quickly filled with tank air, precluding atmospheric air admission thorugh valve 44. Therefore, under the condition hereinabove indicated, the importance of the leakage flow of tank water through port 39 resides in the effect thereof to provide what may be termed a water seal of the port such as to prevent passage of tank air through the port into the fitting chamber.

Atmospheric air thus admitted to the upper portion of the conduit including conduit section 48, is delivered to the tank 10 upon subsequent operation of the pump, the pumped water then in displacement through the delivery conduit serving to push the air into the tank for addition to the air volume above the water therein. The foregoing cycle of atmospheric air admission will occur so long as the tank water level is at or above the normal tank level at each shut-down of the pump.

Whenever in the operation of the pumping system with the present tank air make-up provision, the volume of air in the tank becomes excessive, the pump shut-down water pressure will be reached before the tank water level attains the indicated normal level. Therefore, the fitting chamber 38 will be exposed to tank air through port 39, and as suction is established in chamber 38 in accordance with water column drop back in conduit 15 consequent to delayed closure of the ball check valve 55, tank air will be drawn into the fitting chamber and through pipe 47, into the evacuated conduit portion including section 48. Under such condition, admission of atmospheric air is precluded until normal tank air volume is restored. Thus it will appear that so long as there is an excessive volume of air in the tank, the air control cycle is such as to remove air from the tank to the delivery conduit upon pump shut-down, and to return the air to the tank upon subsequent pump operation. This cycle will continue until the tank air volume is reduced as by loss in the water discharged to service use, to or below the normal volume, when the cycle of atmospheric air admission will become effective.

In the air volume control arrangement as now described, the extent of evacuation of the conduit is a function of the extent of drop-back of the water column in the conduit 15 as permitted by the ball check valve 55 in delayed-closure relative to the valve seat 54. It will appear then, that the amount of atmospheric air drawn-in to the upper portion of the conduit in the region of conduit section 48, following each shut-down of the pump unit, may be determined at a desired value in a given installation, by locating the ball valve stop means 56 a predetermined distance above the valve seat 54, whereby to attain the required time-delay in the closure of the ball check valve. Re-locating the stop means at a greater or a lesser distance above the valve seat 54, which may be accomplished readily in a sectionalized conduit assembly as herein illustrated, thus will determine a correspondingly greater or lesser extent of water drop-back in the conduit, and hence an increase or decrease in the volume of atmospheric air admitted in the cycle as hereinabove described.

Figure 5:
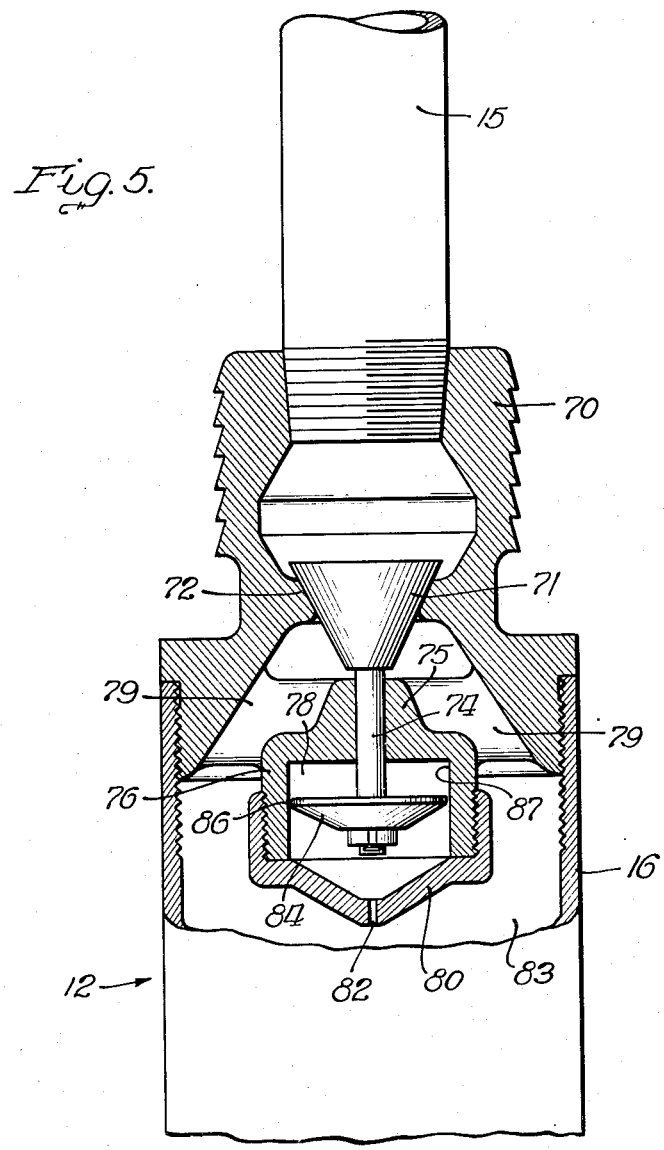
Fig. 5 is a sectional view of the conduit end in connection to the discharge side of the pump, illustrating therein a modified form of delayed closure check valve suitable for use in the present air volume control provision.

Fig. 5 illustrates a dash-pot form of check valve suitable for substitution in place of the ball check valve device of Fig. 2. As shown, the fitting 70 (corresponding to the fitting 52 in Fig. 2) connecting the lower end of conduit 15 to the discharge end 16 of the pump 12, supports therein a poppet type check valve 71 associated with fitting valve seat 72. The valve 71 has a stem 74 slidable through a thickened wall 75 of an inverted cup-shaped member 76 providing a dash-pot chamber 78. Member 76 is suitably supported rigidly with the fitting as through spider arms 79, and has the open side of the chamber 78 thereof closed by a removable cap 80, the latter having a restricted relief port 82 communicating the chamber 78 with the space 83 in the discharge end of the pump so that the chamber normally will be filled with water. Suitably attached to the valve stem 74 is a plate-like piston 84, the piston being operative in the chamber 78 with its peripheral margin 86 relatively closely adjacent the chamber wall 87 such as to retard the transfer of water about the piston periphery from one side of the piston to the other in the chamber 78, during piston displacement. Accordingly, the action of the dash-pot to delay closure of the valve 71 upon cessation of pump delivery of water through the conduit 15, may be determined through proper selection of the clearance of the piston margin 86 relative ot the dash-pot chamber wall 87 and the size of the restricted relief port 82, such as to provide the desired retardation of valve closure.

It will be appreciated now from the foregoing description, that the present invention affords a relatively simple yet highly effective air volume control for pumping systems of the type described and herein illustrated, wherein the control functions in the manner set forth, to maintain the desired air volume in the service water storage tank. Accordingly, having described the invention as to presently preferred embodiments thereof, what I desire to claim and secure by Letters Patent is:

1. In a fluid pumping system, a fluid receiver, a pump for delivering fluid to the receiver, the pump including a conduit fitting at its discharge end, a delivery conduit connected to said fitting and extending to connection with said receiver, a check valve in the conduit relatively adjacent the receiver, provided for preventing return flow of fluid from the receiver through the conduit, suction operated air inlet means open to the portion of the conduit between said check valve and pump, means in said fitting forming a valve seat, stop means in said portion of the conduit at a point thereof relatively remote from said value seat, and a valve element free in said conduit portion for movement between said valve seat and stop means, said valve element normally engaging said stop means during pump delivery of fluid through the conduit, and operable by displacement from said stop means to said valve seat in response to cessation of pump delivery of fluid through the conduit, to close said conduit at said valve seat, the valve element during said displacement thereof to the valve seat, permitting flow of fluid from said conduit portion past said valve seat and through the pump, thereby to create suction in the conduit portion, and said air inlet means operating in response to the suction in the conduit portion, to admit air to the conduit portion for delivery to the receiver upon subsequent pump delivery of fluid through the conduit.

2. In a fluid pumping system, a fluid receiver, a pump, conduit means between the discharge side of the pump and said receiver for the delivery of pumped fluid to the receiver, a check valve in the conduit means near the receiver, provided for preventing return flow of fluid from the receiver through the conduit means, said conduit means including a vertical portion comprised of connected pipe sections, means forming a valve seat adjacent the lower end of the lowermost of said pipe sections, stop means in said vertical conduit portion and spaced above said valve seat by a distance at least approximately equal to the length of the lowermost of said pipe sections a valve free in said conduit portion for movement between said valve seat and stop means, said valve normally in engagement with said stop means during pump delivery of fluid through the conduit means, being adapted for response to cessation of pumped fluid flow in the conduit means, by displacement downwardly in said conduit portion at a predetermined retarded rate, to seating on said valve seat, the valve during said downward displacement permitting flow of fluid from the conduit means through the pump, thereby creating suction in the section of the conduit means extending from said check valve on the pump side thereof, and suction operated air inlet means communicating with said section of the conduit means and responsive to suction therein, to admit air to said conduit section for delivery to the receiver upon subsequent pump delivery of fluid through the conduit means.

3. In a fluid pumping system, a fluid receiver, a pump having a discharge outlet, a conduit between the discharge outlet of the pump and said receiver for the delivery of pumped fluid to the receiver, a check valve in the conduit near the receiver end thereof, provided for preventing return flow of fluid from the receiver through the conduit, a second check valve in said pump discharge outlet, means for constraining said second check valve to a delayed closure upon cessation of pump delivery of fluid through the conduit, thereby to permit fluid flow from the conduit through the pump during the period of said delayed closure of the second check valve, said fluid flow in the period of delayed closure of the second check valve, being effected to create suction in the portion of the conduit extending from the first said check valve on the pump side of the latter, and valved air inlet means open to the last said portion of the conduit and responsive to the suction therein to admit air to the conduit portion for delivery to said receiver upon subsequent pump delivery of fluid through the conduit.

4. In a fluid pumping system as set forth in claim 3, wherein said means for constraining said second check valve to a delayed closure is constituted by a fluid-containing cylinder and a piston therein operatively connected to said second check valve.

5. In a fluid pumping system, a reservoir for the storage of fluid under air pressure established above a predetermined normal level of fluid therein, a pump, a conduit between the discharge side of the pump and said reservoir for the delivery of pumped fluid to the latter, a check valve in the conduit near the reservoir for preventing return flow of fluid from the reservoir through the conduit, air supply means including a suction operated atmospheric air inlet control valve, said means being open to a portion of said conduit adjacent said check valve on the pump side of the latter and having restricted communication with said reservoir at the normal fluid level therein, and check valve means in said conduit near the discharge side of the pump, adapted for delayed closure upon cessation of pump delivery of fluid through the conduit, thereby to establish limited back flow of fluid in the conduit past the check valve means, said fluid back flow evacuating said portion of the conduit and air supply means, the resultant suction in the air supply means being effective when the fluid level in the reservoir is above said normal level, to cause suction operation of said air inlet valve to admit atmospheric air to the air supply means and said conduit portion for delivery to the reservoir upon subsequent pump delivery of fluid through the conduit, and being effective when the fluid level in the reservoir is below said normal level, to establish withdrawal of air from the reservoir through said restricted communication into the air supply means and said conduit portion, for return to the reservoir upon subsequent pump delivery of fluid through the conduit.

6. In a fluid pumping system, the combination as defined by claim 5 wherein suction operation of said air inlet valve to admit atmospheric air to the air supply means, is prevented by reservoir air established in the air supply means and said conduit portion by said resultant suction withdrawing air from the reservoir through said restricted communication when the fluid level in the reservoir is below said normal level.

HENRY C. WEBER.

References Cited in the file of this patent

UNITED STATES PATENTS

| Number | Name | Date |
|---|---|---|
| 1,365,359 | Vaile | Jan. 11, 1921 |
| 1,552,088 | Smith | Sept. 1, 1925 |
| 2,215,815 | Hartmann | Sept 24, 1940 |
| 2,327,601 | Kent | Aug. 24, 1943 |
| 2,387,941 | Patterson | Oct. 30, 1945 |

FOREIGN PATENTS

| Number | Country | Date |
|---|---|---|
| 389,388 | Germany | Feb. 7, 1924 |
| 765,445 | France | Mar. 26, 1934 |